United States Patent Office 3,555,415
Patented Jan. 12, 1971

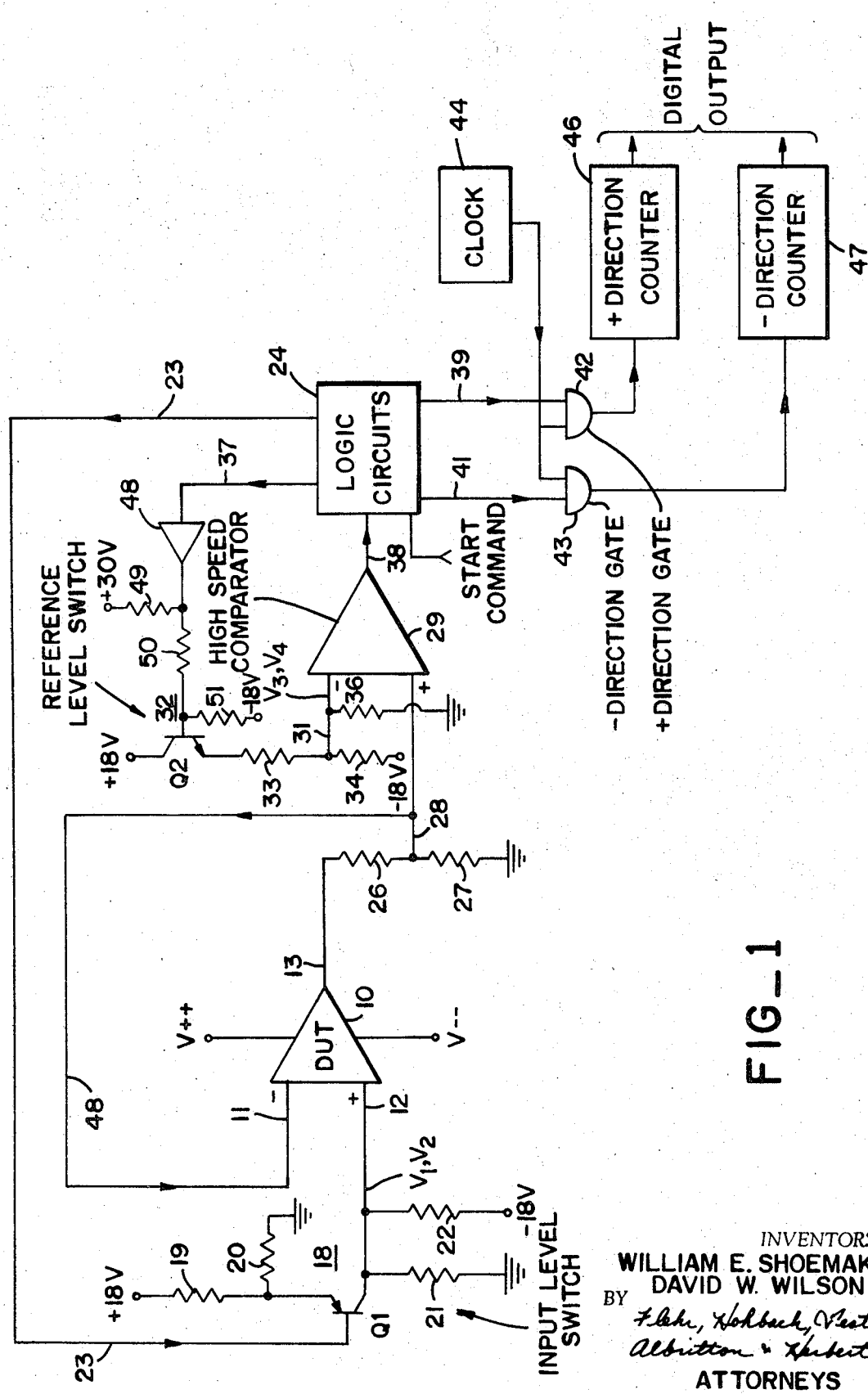

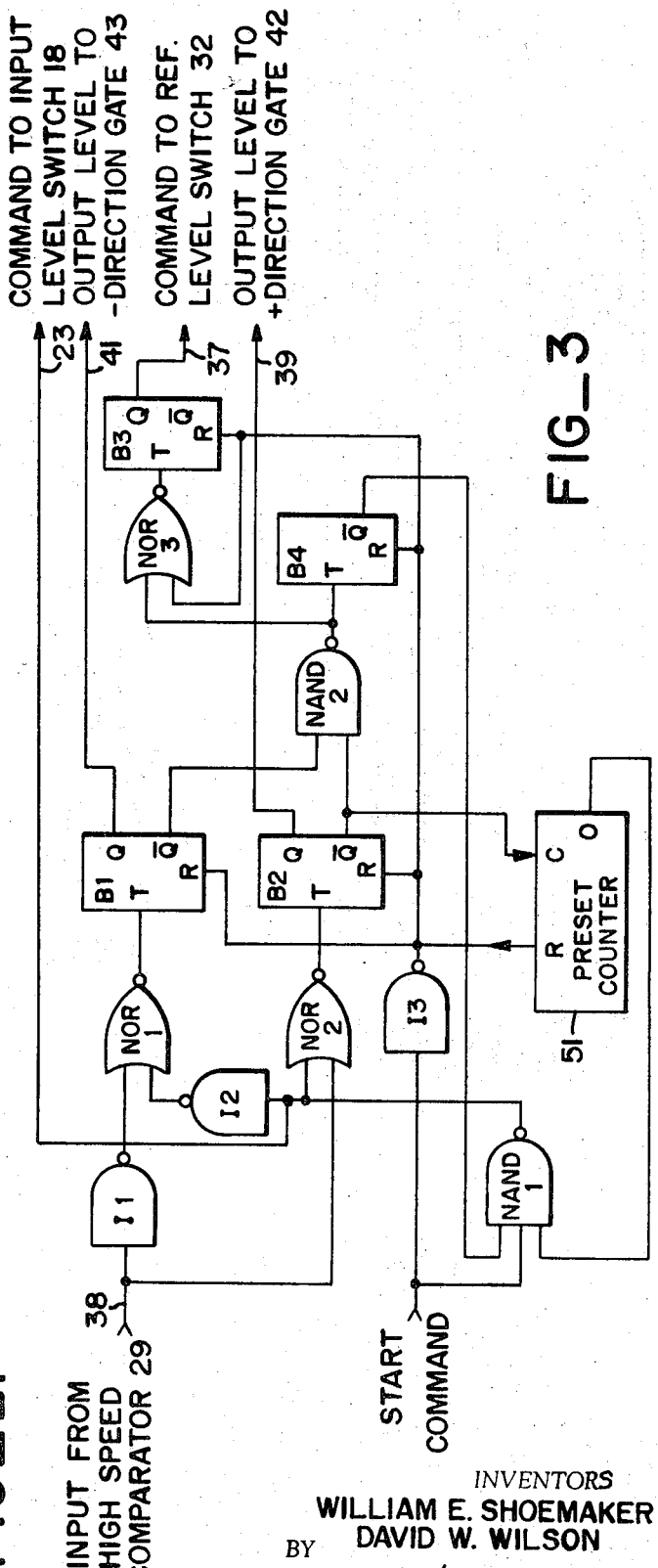

3,555,415
AMPLIFIER TESTING APPARATUS HAVING A COMPARATOR FOR COMPARING THE AMPLIFIER OUTPUT SIGNAL WITH A PAIR OF REFERENCE SIGNALS
William E. Shoemaker, Los Altos, and David W. Wilson, Sunnyvale, Calif., assignors to Signetics Corporation, Sunnyvale, Calif., a corporation of California
Filed Jan. 27, 1969, Ser. No. 794,330
Int. Cl. G01r 27/00
U.S. Cl. 324—57         8 Claims

ABSTRACT OF THE DISCLOSURE

Response time measuring apparatus for measuring response time in both the positive and negative directions of an electrical device such as an operational amplifier. The input to the device is switched between two different voltage levels producing an output voltage having positive and negative ramps. These are coupled into a comparator and the ramps are compared to two switchable reference level voltages. The comparator detects the crossovers of the voltages to provide command signals for switching both the input level voltages and the reference level voltages and causing an associated logic circuit to produce pulse trains having pulses of a time duration indicative of the response times of the output voltage of the device.

BACKGROUND OF THE INVENTION

This invention relates to response time measuring apparatus and more particularly to apparatus for measuring the response time of operational amplifiers.

In measuring the response characteristic of an electrical device such as an operational amplifier, an input signal is applied to the device and the rate of response sensed. One type of response characteristic is slew rate which is usually defined as the time rate at which the output voltage changes when the input is overdriven.

It is apparent that to measure slew rate, for example, two separate reference voltage levels must be established. At the present time measuring apparatus includes two comparators for this purpose. With this scheme error is a function of the difference in the two comparators' offset voltage, input currents and propagation delays.

The resolution of present measuring apparatus is also deficient especially when a digital result is desired. Resolution is proportional to the number of digital counts which in present systems is limited either by the clock frequency of the system or the basic measuring technique.

SUMMARY AND OBJECTS OF THE INVENTION

It is, therefore, a general object of the invention to provide an improved response time measuring apparatus.

It is another object of the invention to provide apparatus as above in which errors are minimized.

It is another object of the invention to provide a measuring apparatus having improved accuracy at reasonable cost.

In accordance with the above objects there is provided a response time meausring apparatus for an electrical device having an input and output comprising input switching means for selectively coupling first and second input voltage levels to the input of the device. Comparator means are provided having a signal input adapted for coupling to the output of the device and having a reference input. The comparator means selectively compares first and second reference voltage levels to an output signal on the device output resulting from the first and second input voltage levels. Reference switching means selectively couple the first and second reference voltage levels to the reference input of the comparator means. The comparator means has an output signal when the device output signal exceeds a reference voltage level. Logic means are responsive to the output signal of the comparator means for actuating the input switching means and the reference switching means for switching the reference voltage and input voltage between their two levels.

BRIEF DESCRIPTION OF THE DRAWINGS

FIG. 1 is a schematic diagram of measuring apparatus embodying the present invention;

FIGS. 2A through 2F are waveforms useful in understanding the present invention; and FIG. 3 is a logic circuit for a portion of FIG. 1.

DETAILED DESCRIPTION OF THE INVENTION

As illustrated in FIG. 1 a device under test 10 such as an operational amplifier includes an inverting input 11, a noninverting input 12 and an output 13 along with positive and negative voltage supplies designated V+ and V—. Inputs 11 and 12 and output 13 are coupled into the measuring apparatus. While an operational amplifier is shown in the preferred embodiment, other electrical devices may be easily substituted in the present measuring apparatus.

Coupled to input 12 of device 10 are input switching means 18 designated "input level switch" for selectively coupling first and second input voltage levels to the input of devict 10. Switch 18 includes a transistor Q1 having its emitter biased from a positive 18-volt source through a series connected resistor 19 and a grounded second resistor 20 between resistor 19 and the emitter. The collector Q1 is coupled to a grounded resistor 21 and a resistor 22 which is coupled to a negative 18-volt source. Resisitors are so proportioned that when Q1 is in a conductive condition approximately 3 volts will be coupled into input 12 of device 10; when Q1 is open or nonconductive, the resistor network 21, 22 will provide a negative 3 volts to input 12. The condition of Q1 is controlled by a base input 23 which is coupled to logic circuits 24.

The output 13 of device 10 is coupled to series connected attenuating resistors 26 and 27, the resistor 27 being coupled to ground. A junction line 28 between these two resistors 26 and 27 provides a signal input to a high speed comparator 29. Comparator 29 also includes a reference input 31 which provides two different voltage levels $V_3$ and $V_4$ which the comparator selectively compares to the signal on line 28. This, of course, is the attenuated output signal from device 10. The reference voltage levels are provided by a reference level switch 32 which includes a transistor Q2 having its collector coupled to a positive 18 volt source and its emitter coupled to a negative 18 volt source through series connected resistors 33 and 34. The junction between resistors 33 and 34 is line 31 which provides the reference level voltages of $V_3$ and $V_4$ to the reference level input of comparator 29. Also coupled to line 31 is a resistor 36 which has its other terminal grounded.

Transistor Q2 is actuated by the resistive network 49, 50, and 51, and the output of interface amplifier 48 on a line 37 from logic circuits 24 and provides a square wave reference voltage to the comparator 29. Transistor Q2 is operated in the inverted configuration to produce a low offset voltage when conducting. With Q2 in a conductive condition a positive 2 volts is applied to line 31 and in a nonconductive condition the negative 18-volt source in combination with the resistors 34 and 36 provides a negative 2 volts. Comparator 29 is of a standard design and may be, for example, a comparator designated "SE 526."

Comparator 29 has an output signal on a line 38 which is connected to logic circuits 24. The output signal of the comparator changes state whenever the output signal on lines 13 and 28 from device 10 crosses over one of the reference voltage levels, either $V_3$ or $V_4$ which is present on line 31 at that time. If the output signal exceeds the reference voltage level a V+ digital logic level is produced on line 38, if it is less than the reference voltage level the comparator output on line 38 is a 0 logic level.

Logic circuits 24 initiate a response measurement through a Start Command coupled to it. Commands from logic circuits 24 on lines 37 and 23 to the reference level switch 32 and input level switch 18 respectively cause the switches to switch between their two different voltage levels.

Logic circuits 24 also have a + direction output gating line 39 and a − direction output gating line 41 which are coupled into AND gates 42 and 43, respectively. The other coincident input to the AND gates is provided by a clock 44 which may, for example, have a frequency of approximately 20 megahertz. The output of AND gates 42 and 43 are coupled respectively to a + direction counter 46 and a − direction counter 47 which in turn have a digital output which is indicative of the rise and fall times of the device under test 10.

A feedback line 48 is coupled from the junction between resistors 26 and 27 from the output of device 10 back to the input 11. This keeps device 10 out of saturation during the measurement procedure.

OPERATION

The operation of the circuit of FIG. 1 is more clearly apparent from the waveforms in FIGS. 2A through 2F. In these waveforms the various voltage levels are defined as follows: 0 and V+ are digital logic levels; $V_1$ and $V_2$ are input voltage levels to input 12 of device 10 as indicated on the drawing of FIG. 1; and $V_3$ and $V_4$ are reference voltage levels to comparator 29.

To initiate the testing procedure, a start command on the Start Command input to logic circuit 24 is given as illustrated in FIG. 2A which applies a V+ logic level voltage to the logic circuit. A command signal on line 23 from the logic circuit 24 places Q1 in a conductive condition switching the input voltage from the $V_2$ level to the higher $V_1$ level as indicated in FIG. 2B. This voltage transition causes the output voltage on line 13 of device 10, and also the input to comparator 29 as illustrated in FIG. 2G to start to build up as a positive ramp voltage. At this time the reference voltage to the comparator is at level $V_4$. When the input voltage to comparator 29 crosses over the reference voltage $V_4$ the output voltage of the comparator on line 38 as shown in FIG. 2D undergoes a transition to the V+ level. This change is communicated through command line 37 to the reference level switch 32 which causes the reference level switching means to switch to its other reference voltage level or $V_3$, as shown in FIG. 2C. The slight delay shown between the crossover time, that is the time at which the input signal to comparator 29 crosses over $V_4$, and the switching time of the reference level switch is due to propagation delays in the circuit. When the reference level switch 32 switches to the $V_3$ level there is another crossover of the input signal to comparator 29 since the attenuated output signal from the device 10, line 28, is no longer exceeding the reference level voltage. This causes the output of the comparator to drop back to its zero logic level as shown in FIG. 2D.

However, when the $V_3$ voltage level is exceeded by the attenuated output from device 10, comparator 29 again has a transition to the V+ level and at this time the logic circuits 24 are responsive to the transition of the comparator to provide a command signal on line 23 to cause the input level switch 18 to switch to the other input voltage level $V_2$ as illustrated in FIG. 2B. When this occurs, the output signal from the device 10 on line 13 starts to fall. Line 28 likewise starts to fall. When it falls below voltage level $V_3$ the reference level is switched back to level $V_4$. When this occurs, the attenuated output signal of device 10, line 28, is then greater than the reference level of $V_4$ to cause the comparator output on line 38 to switch to a V+ logic level. When this V+ logic level is crossed over by the falling attenuated output signal from device 10 the input voltage level to device 10 will switch to level $V_1$.

An indication of the response times of the device 10 is produced by logic ciriucits 24 by providing on lines 39 and 41 waveforms as shown in FIGS. 2E and 2F, respectively. Specifically, the waveform of FIG. 2E appears on line 39 and controls the + direction gate 42. This waveform is generated by the two crossovers of the rising attenuated output signal from device 10 as it crosses over respectively the $V_4$ voltage level and the $V_3$ voltage level. The pulse width is inversely proportional to slow rate.

The output signal on line 41 is a measure of slew rate in the negative direction as illustrated in FIG. 2F which has a pulse width determined by the crossover of the attenuated negative going output voltage from device 10 as it crosses over voltage levels $V_3$ and $V_4$. Since the pulse widths of the inputs to gates 42 and 43 are inversely proportional to slew rates a digital output is provided by use of a clock 44 which is supplying counts to the counters 46 and 47 during periods that gates 42 and 43 are closed. It is apparent that the sum of the counts from clock 44 will be inversely proportional to the slew rates or generally the response characteristic of device 10.

In practice, several iterations, for example four or more, will be taken of the output signal of device 10. The first complete slow cycle is labeled in FIG. 2C as "first triangle" which is the time for the output voltage to rise to a maximum and then fall back substantially to its original value. The next complete slow cycle is labeled "first iteration." By using successive iterations to add to the total count, resolution is greatly improved. For example, with a 20 megahertz clock 44 and the + gate 42, for example, enabled for a slow time duration of 1.234 microseconds, 24 or 25 counts will be entered into the + direction counter 46 during the rise time of the output voltage from device 10. If this value were to be taken as the measure of rise time, it would mean a resolution of only $\frac{1}{25}$ or 4% of reading. Permitting 49 iterations would improve the resolution by 50 times to give a resolution of .08% of the reading. Since the iterations and the 20 megahertz clock 44 are asynchronous, it can be predited that 24 counts would be accumulated on 16 of the 50 slew rate cycles, and 25 counts would be accumulated on each of the 34 other slew rate cycles, to give a total count of 1234.

It is also apparent that the use of successive iterations enables a clock 44 to be used which has a relatively lower frequency capability. This is important from a cost standpoint since the 20 megahertz frequency can be provided with relatively simple and economical circuitry. Higher frequencies require much more elaborate appartus.

The use of a single high speed comparator 29 as opposed to dual comparators also eliminates errors due to differences in offset voltages, input currents and comparator propagation delays. With the use of the single comparator of the present invention, these sources of errors do not exist.

The measuring apparatus also efficiently utilizes components since both positive going and negative going slew rates are measured in the same test cycle, namely, one test "triangle."

As discussed above, the input level to device 10 switches between the two voltage levels $V_1$ and $V_2$ which approach $\pm 3$ volts. However, the feedback input voltage levels on line 48 will never reach the maximum 3-volt limit because of the lower reference voltages $V_3$ and $V_4$ of substantially $\pm 2$ volts to comparator 29. As soon as the comparison level of 2 volts is reached, the logic circuit 24 reverses the input voltage thereby causing the device under test 10 to move toward the opposite polarity.

The operation of logic circuits 24 is illustrated more clearly in FIG. 3 which shows a detailed diagram of the logic circuits in the form of NOR gates, inverters designated I, NAND gates and binary or flip-flop switches designated with the prefix B. In addition a preset counter 51 determines the number of iterations of the testing cycle.

Before the incidence of a start command the output of inverter I3 is high; binaries B1, B2, B3 and B4 are preset by having their reset, or R, inputs high so that their Q output is low and the Q outputs are high. The counter output "0" is also high at this time.

When the start command goes high the output of NAND 1 goes low in view of the coincidence of high inputs from the $\overline{Q}$ terminal of binary B4 and from the output "0" of counter 51. A low output of NAND 1 produce a command on line 23 which causes the input level switch 18 to close and switch line 12 from level $V_2$ to level $V_1$. As illustrated in FIG. 2C this action causes the output signal from device 10 to start rising in value. When line 28, the attenuated output of DUT 10, crosses the $V_4$ reference voltage level which is present on inverting input 31 of the comparator 29, a high output on line 38 of the comparator causes NOR 2 to produce a low output toggling binary B2 so that its Q output is high and $\overline{Q}$ is low. This change of state of binary B2 is coupled into the "C" input of preset counter 51 and causes the counter to be incremented one count. Low on $\overline{Q}$ of B2 also produces a high output on NAND 2 causing NOR 3 to go low and toggle B3 to switch to the high condition on its Q output designated 37. This is the command to the reference level switch 32 which, as illustrated in FIG. 2C, causes the reference level to switch from $V_4$ to $V_3$.

At this time with the output signal from device 10 rising forming a ramp with a positive slope the binary B2 is in effect a positive direction indicator since it was toggled into its present condition (a high on the Q output terminal) by the attenuated positive ramp output voltage from device 10.

The change of the reference voltage level from $V_4$ to $V_3$ causes this voltage to have a value greater than the attentuated output voltage of device 10. This causes a transition of the output voltage of comparator 29 to a low or zero logic level. The output or NOR 2 goes high; however, binary B2 is unaffected since only transitions from high to low will toggle any of the binaries.

When the attentuated output signal from device 10 reaches the $V_3$ reference voltage level the output of the comparator again goes high causing the output of NOR 2 to go low to thus toggle the output of binary B2 to return its Q output to a low condition. The + direction gate 42 is therefore opened because of the low on line 39. As the $\overline{Q}$ output of B2 goes high the output of NAND 2 goes low toggling B4 so that its $\overline{Q}$ output goes low. This causes the output of NAND 1 to go high, and thus the command on line 23 to input level switch 18 goes high allowing the input voltage level to device 10 to return to its original $V_2$ level. Thus the direction of the attenuated output signal from device 10 changes to a negative ramp and crosses the $V_3$ reference level again.

When the attenuated output crosses over the $V_3$ level in a negative direction the comparator output goes low to its zero level, the output of I1 goes high causing the output of NOR 1 to go low toggling binary B1. The high on the Q output of B1 opens the —directions gate 43 on output line 41. Binary B1 therefore stores information as to the negative slope of the device output signal.

A low on the $\overline{Q}$ output of B1 causes NAND 2 to go high and consequently NOR 3 to go low toggling binary B3 low. This places a low on line 37 to reference level switch 32 to cause the reference level voltage to return to $V_4$. Since at this time the attenuated output voltage level exceeds the reference level the comparator output is high. Also the output of NOR 1 is high. Again as in the previous case with NOR 2 a transition of NOR 1 from low to high causes no toggling of binary B1 so therefore the negative slope direction of the attenuated output signal from device 10 is still stored in B1.

When the attenuated output signal of device 10 reaches or crosses over the $V_4$ reference level, the comparator output goes low causing the output of inverter I1 to go high, causing the out of NOR 1 to go low, and toggling binary B1 causing the $\overline{Q}$ output to go high. This causes the output of NAND 2 to go low which toggles binary B4 so that a high is placed on the $\overline{Q}$ output. This enables the output of NAND 1 to go low and 12 to low low thus commanding the input level switch 18 to plave a $V_1$ voltage on the device input 12. Thus the output signal from device 10 starts to move in the positive direction again and to start the first iteration.

During the start of the last iteration the $\overline{Q}$ output of B2 will make its last high to low transition and the output of the preset counter will then inhibit further iterations after completion of the current one.

Thus from the above description of the logic circuit of the present invention it is apparent how the various commands to the input level switch 18 and the reference level switch 32 are coordinated in sequence in response to output signals from comparator 29. The amount of iteration is controlled by the preset number in counter 51 which is determined by the desired accuracy of the data results.

Therefore, in summary the present invention has provided an improved response time measuring apparatus for measuring both positive going and negative going slew rates which utilizes a single comparator for improved, error free operation and a large number of iterations for improved accuracy. The clock frequency providing the digital counts is asynchronous with respect to the iteration rate thus allowing statistical averaging of the number of digital counts per iteration for improved accuracy.

If desired, the clock and counters and direction gates can be eliminated by applying the gate signals of FIGS. 2E and 2F to the inputs of two analog integrators. However, this would limit the accuracy of the testing apparatus.

What is claimed is:

1. Response time measuring apparatus for an electrical device having an input and an output comprising, input switching means for selectively coupling first and second input voltage levels to said input of said device, comparator means having a signal input adapted for coupling to said output of said device, and a reference input, said comparator means selectively comparing first and second reference voltage levels to an ouput signal on said device output resulting from said first and second input voltage levels, reference switching means for selectively coupling said first and second reference voltage levels to said reference input of said comparator means, said comparator means having an output signal in response to said device output signal exceeding said reference voltage levels, and logic means responsive to said output signal of said comparator means for actuating said input switching means and said reference switching means for switching said reference voltage and said input voltage between said levels.

2. Response time measuring apparatus as in claim 1 in which said logic means includes means responsive to said output signal from said comparator means for sequentially activating said input switching means and said reference switching means.

3. Response time measuring apparatus as in claim 2 in which said sequential activating means is responsive to said device output signal exceeding one of said reference voltage levels for causing said reference switching means to switch to the other reference voltage level.

4. Response time measuring apparatus as in claim 3 in which said sequential activating means is responsive to said device output signal exceeding said other reference voltage level for causing said input switching means to switch to the other input voltage level.

5. Response time measuring apparatus as in claim 1 in which said logic means includes a preset counter for providing a predetermined number of iterations of the switching of the said input voltage between said two levels.

6. Response time measuring apparatus as in claim 5 in which said logic means includes a binary flip-flop which is responsive to a change in slope of said output signal of said device to cause said preset counter to increment one count.

7. Response time measuring apparatus as in claim 1 in which said logic means includes a first binary flip-flop for storing information of the positive slope of said output signal of said device and including a second binary flip-flop for storing information of the negative slope of said output signal of said device.

8. Response time measuring apparatus as in claim 1 together with counting means and clock means, having a predetermined frequency, said counting means being responsive to said output signals of said comparator means for counting at said clock frequency, the time duration of said counting being determined by said output signals and proportional to the slew rate of said device.

References Cited

UNITED STATES PATENTS

| | | | |
|---|---|---|---|
| 2,337,541 | 12/1943 | Burgess | 324—57X |
| 2,794,952 | 6/1957 | Golden et al. | 324—57 |

EDWARD E. KUBASIEWICZ, Primary Examiner

U.S. Cl. X.R.

330—2